(12) United States Patent
Gresley et al.

(10) Patent No.: US 8,043,186 B2
(45) Date of Patent: Oct. 25, 2011

(54) TWO STAGE CHECK VALVE FOR AUTOMATIC TRANSMISSION SYSTEM

(75) Inventors: Ross Gresley, Fort Mill, SC (US); Eric Nelson, Charlotte, NC (US)

(73) Assignee: Schaeffler KG, Herzogenaurach (DE)

( * ) Notice: Subject to any disclaimer, the term of this patent is extended or adjusted under 35 U.S.C. 154(b) by 934 days.

(21) Appl. No.: 12/025,220

(22) Filed: Feb. 4, 2008

(65) Prior Publication Data

US 2008/0188352 A1 Aug. 7, 2008

Related U.S. Application Data

(60) Provisional application No. 60/888,159, filed on Feb. 5, 2007.

(51) Int. Cl.
*F16H 57/04* (2010.01)
(52) U.S. Cl. .................... 475/161; 137/516.27
(58) Field of Classification Search .................. 475/161; 137/516.27
See application file for complete search history.

(56) References Cited

U.S. PATENT DOCUMENTS

| | | | | |
|---|---|---|---|---|
| 2,625,056 A * | 1/1953 | Kelley | ............................. | 475/71 |
| 2,717,673 A * | 9/1955 | Zeidler | ........................... | 192/3.3 |
| 2,720,124 A * | 10/1955 | Polomski | ....................... | 475/137 |
| 2,786,368 A * | 3/1957 | Cook | ............................... | 192/221 |
| 2,861,480 A * | 11/1958 | Curtis | ........................... | 74/732.1 |
| 3,010,278 A * | 11/1961 | Winchell et al. | ................ | 60/354 |
| 3,099,166 A * | 7/1963 | Schou | .............................. | 74/359 |
| 3,103,832 A * | 9/1963 | Foerster | .......................... | 475/64 |
| 3,303,726 A * | 2/1967 | Christenson | ................... | 475/125 |
| 3,749,123 A * | 7/1973 | Fletcher et al. | ........... | 137/516.27 |
| 3,977,502 A * | 8/1976 | Chana | ............................ | 192/3.3 |
| 6,951,209 B2 * | 10/2005 | Yanase et al. | .................. | 123/516 |

\* cited by examiner

*Primary Examiner* — Sherry Estremsky
(74) *Attorney, Agent, or Firm* — Lucas & Mercanti, LLP

(57) ABSTRACT

The two stage check valve for the automatic transmission system provides a first member that opens in response to a first pressure and a second member which opens in response to a second pressure where the second pressure is higher than the first pressure.

17 Claims, 3 Drawing Sheets

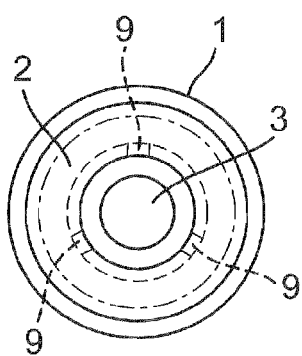
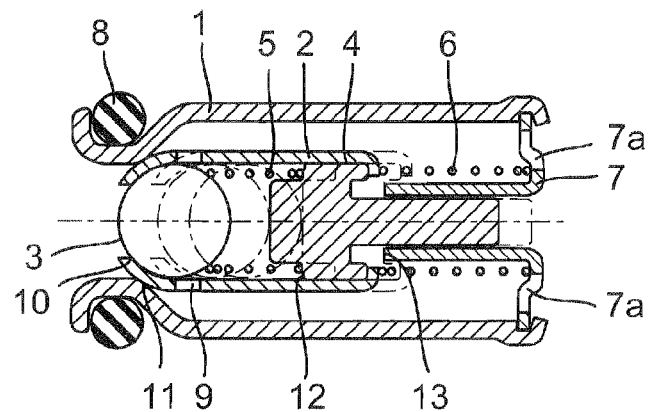
Fig. 1B    Fig. 1A
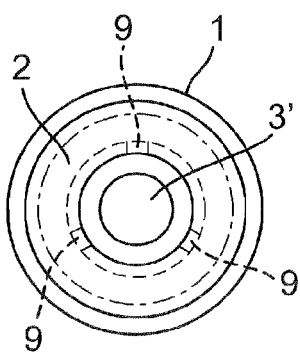
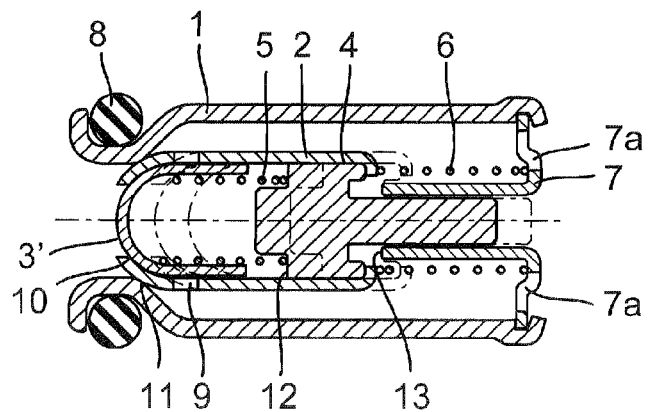
Fig. 2B    Fig. 2A

TWO STAGE CHECK VALVE FOR AUTOMATIC TRANSMISSION SYSTEM

FIELD OF THE INVENTION

The present invention relates to automatic transmissions and, more particularly, to check valves used in automatic transmission input shafts for automobiles.

BACKGROUND OF THE INVENTION

Automatic transmission systems have hydraulic circuits which includes a hydraulic pump, a torque converter, and clutch packs. An input shaft transfers power from the torque converter to the planetary gear set. To cool the clutch packs, the input shaft has a bore that allows automatic transmission fluid to flow between the torque converter and the clutch packs.

When the vehicle engine is off and the pump is not running, automatic transmission fluid generally flows out of the torque converter and thus, at initial engine startup, the torque converter has insufficient automatic transmission fluid to operate properly.

In order to solve this startup problem and prevent the flow of automatic transmission fluid from the torque converter when the engine is off, a single-stage check valve is placed in the bore of the input shaft between the torque converter and the clutch plates. The single-stage check valve closes the hydraulic circuit during periods when the pump is off to prevent the flow of automatic transmission fluid from the torque converter. Typically, these single-stage check valves open at a pressure of about 2-4 psi and allow for a flow of 6 liters per minute at idle and up to 18 to 20 liters per minute at maximum flow rate.

One of the problems with the single-stage check valve is that it opens too far too soon. This causes the transmission's open clutch pack to flood with automatic transmission fluid which in turn creates frictional drag. The frictional drag results in frictional losses and increase in fuel consumption.

OBJECT OF THE INVENTION

It is the object of the invention to reduce frictional losses in the automatic transmission system by better controlling the flow of automatic transmission fluid in the hydraulic circuit of the automatic transmission system. Reduction of frictional losses in the automatic transmission provides an advantage of better fuel economy and efficiency.

These and other objects and advantages of the invention will become evident from the following description.

THE INVENTION

The invention achieves the above objects through a two stage check valve housed in the transmission input shaft of the hydraulic circuit of an automatic transmission system. The two stage check valve has a first valve means for opening in response to a first pressure, a second valve means for opening in response to a second pressure. The first pressure is less than the second pressure and the second pressure is less than the normal operating pressure range for the transmission.

Preferably, the two stage check valve has a tubular housing in which the first and second valve means are located in an axial manner, with the first valve means axially positioned inside the second valve means.

The first valve means is preferably a ball or an inner poppet which are biased by a spring in a closed position.

The second valve means is preferably an outer poppet that is biased in a closed position by a spring. The outer poppet can be fluted.

Suitable springs for use in both the first valve means and the second valve means are compression springs.

The first pressure is preferably about 2 psi to about 10 psi (10-70 kPa), and more preferably about 6 psi to about 8 psi (40-55 kPa).

The second pressure is preferably about 65 psi to about 100 psi (400-700 kPa); and more preferably about 75 psi to about 100 psi (500-700 kPa).

The normal operating pressure range is typically about 125 psi (850 kPa).

The two stage check valve of the present invention can be made to operate with different first and second pressures depending on the desired design, provided the first pressure is less than the second pressure and the second pressure is less than the normal operating pressure. The first pressure is set such that it starts the flow of oil, while the second pressure is selected to lessen the restricted flow and allow for proper operation.

Preferably, the two stage check valve prevents the drainage of automatic transmission fluid from the torque converter when the pump is not in operation.

The object of the invention is also obtained by a method for regulating flow of automatic transmission fluid between a torque converter and clutch packs in an automatic transmission where the torque converter is in fluid communication with the clutch packs through a bore in an input shaft of the automatic transmission, the method comprising the steps: a first opening of a first check valve means in response to a first pressure; and a second opening of a second check valve means in response to a second pressure, wherein said first pressure is less than the second pressure.

Examples of embodiments are illustrated in the drawings and will be described in more detail below.

BRIEF DESCRIPTION OF THE DRAWINGS

FIGS. 1a and 1b illustrate the two stage check valve according to the present invention having a ball and an outer poppet;

FIGS. 2a and 2b illustrates a two stage check valve according to the present invention employing an inner and outer poppet;

DETAILED DESCRIPTION OF THE INVENTION

Figure 3B:
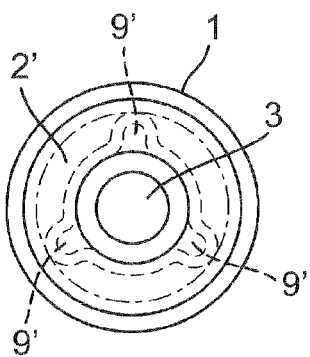
FIGS. 3a and 3b illustrate a two stage check valve according to the present invention having a ball and an outer fluted poppet.

As shown in FIGS. 1a and 1b, a two stage check valve has tubular housing 1 with a sliding tubular poppet 2 which is biased in a closed position by spring 6 against seat 11 of housing 1. Spring 6 is held in place by endplate 7 of the valve assembly. A ball 3 is housed inside the poppet 2 and is biased in a closed position by spring 5 against seat 10 in the tubular poppet 2. Spring 5 is held in place by shuttle 4 which is part of tubular poppet 2. Shuttle 4 has surface 12 and endplate 7 has surface 13 which control the opening distance of the ball and the poppet, respectively.

Figure 5:
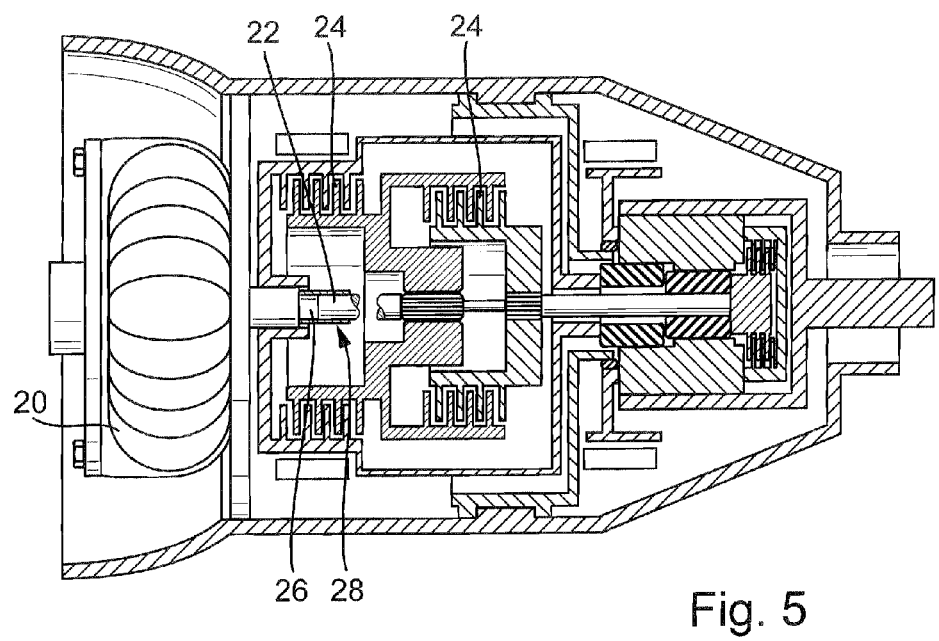
FIG. 5 illustrates the two stage valve according to the present invention positioned in a transmission input shaft.

The check valve is mounted in a bore of a transmission input shaft as described below and sealed by O-ring 8 as shown in FIGS. 5-7. Seats 10 and 11 define an annular opening through which fluid flows when the valve is opened. Valve seats 10 and 11 are generally concentric to one another. When the system pressure reaches a determined value, the first pressure, ball 3 is axially displaced from valve seat 10 such that an annular orifice is opened between the outside edge of ball 3 and the inside edge of seat 10. This displacement of the ball opens a flow path which extends generally radially through the orifice defined by seat 10, then fluid passes through radial opening 9, over poppet 2 and out orifice 7a in end plate 7. When the pressure of the flow path increases to a certain level, second pressure, the tubular poppet 2 is axially displaced from valve seat 11 such that an annular orifice opens between the outside edge of seat 11. This fluid path extends generally radially through the orifice defined by the inner edge of tubular member 1 and the outer edge of tubular poppet 2 and moves axially over poppet 2 and out orifice 7a. The opening of the second orifice allows for greater oil flow rate through the check valve and thereby increase the amount of cooling to the clutch packs.

Turning to FIGS. 2a and 2b, it can be seen that ball 3 of FIGS. 1a and 1b has been replaced by an inner poppet 3'. Inner poppet 3' is biased by spring 6 against seat 10.

Figure 3A:
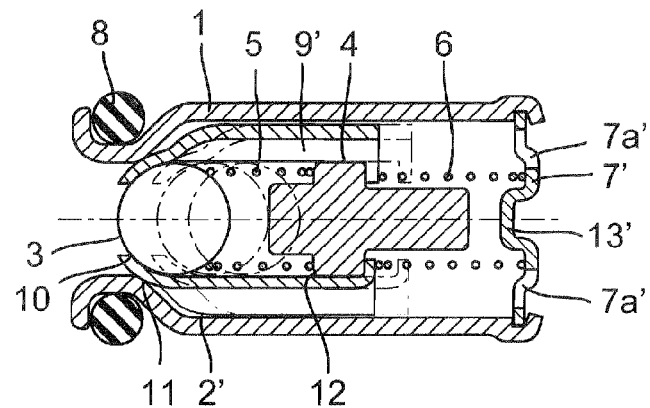

FIGS. 3a and 3b have the same reference characters as FIGS. 1a and 1b, except that outer poppet 2 is a fluted outer poppet 2'.

In FIGS. 3a and 3b and FIGS. 4a and 4b, endplate 7' is flat in shape with orifice 7'a therein for allowing fluid flow through check valve is open. In FIGS. 3a, 3b, 4a, and 4b illustrate an outer fluted poppet 2'.

Figure 4B:
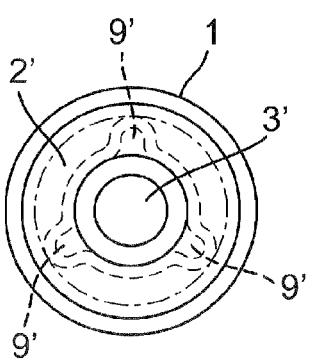
FIGS. 4a and 4b illustrate the two stage check valve according to the present invention using an inner poppet and an outer fluted poppet.
Figure 4A:
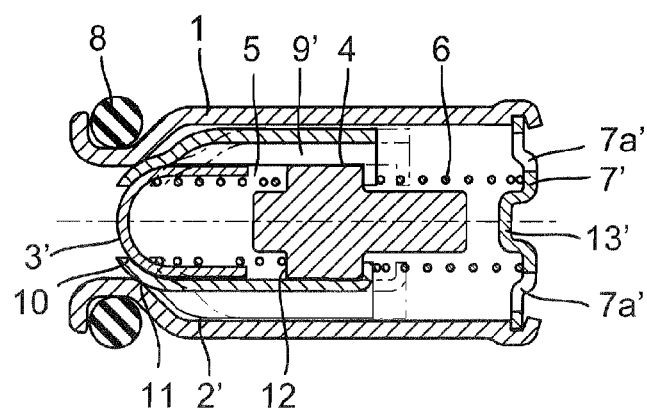

The fluting of outer fluted poppet 2' can be seen by viewing FIGS. 3b and 4b where the fluting defines axial opening 9' and provides a path for the fluid when inner poppet 3' or ball 3 is forced backward away from first seat 10, fluid flows into the orifice defined by seat 10 and travels through axial opening 9' and out orifice 7'a.

When the second pressure is met, outer fluted poppet 2' moves back away from second seat 11 leaving an open orifices defined by seat 11. Automatic transmission fluid can then flow through the orifice defined by seat 11 over the exterior of outer fluted poppet 2' and through orifice 7'a.

The backward movement of outer fluted poppet 2' is limited by surface 13' of end plate 7'.

The rearward movement of ball 3 and inner poppet 3' is limited by surface 12 of shuttle 4.

As can be appreciated, opening of the outer puppet 2 or outer fluted poppet 2' allows for greater oil flow through the check valve than the opening of the ball 3 or inner poppet 3'.

Turning to FIG. 5, FIG. 5 illustrates torque converter 20 having a transmission input shaft 22 and clutch packs 24. Mounted in bore 26 of transmission input shaft 22 is two stage check valve 28 of the present invention The method of the present invention will be described with reference to the two stage check valve of FIG. 1a. When the pump is first turned on, and the automobile is in idle or park, ball 3 moves rearward away from first seat 10. This causes seat 10 to define an orifice which allows automatic transmission fluid to flow through the orifice defined by seat 10, and passing through a radial opening 9 and out through orifice 7a in endplate 7. This means that automatic transmission fluid flows through the check valve from the torque converter to the clutch packs.

When the hydraulic pump has increased the flow rate to the level of the second pressure outer poppet 2 moves rearward away from second seat 11. This means that an orifice defined by second seat 11 has opened and automatic transmission fluid can flow through the orifice defined by second seat 11, over the exterior of outer poppet 2 and through orifice 7a of endplate 7. This opening of the orifice defined by seat 11 allows for greater fluid flow from the torque converter to the clutch packs.

Upon decreased flow of the automatic transmission fluid through the check valve, the two stage check valve can close in stages to insure that a proper amount of automatic transmission fluid is provided to the clutch packs.

REFERENCE CHARACTERS

1 tubular housing
2 outer poppet
2' outer fluted poppet
3 ball
3' inner poppet
4 shuttle
5 first spring
6 second spring
7 T-shaped end plate
7' flat end plate
7a orifice
7'a orifice
8 o-ring
9 radial opening
9' axial opening
10 first seat
11 second seat
12 surface of shuttle
13 surface of end plate
13' surface of end plate
20 torque converter
22 transmission input shaft
24 clutch packs
26 bore
28 two stage check valve

The invention claimed is:

1. An automatic transmission system for vehicles comprising:
    a hydraulic pump;
    a torque converter which is in fluid communication with clutch packs through a bore in a transmission input shaft; and
    a two stage check valve housed in said bore of said shaft, said check valve in fluid communication with said clutch packs and said torque converter, said check valve having a first valve means for opening in response to a first pressure, a second valve means for opening in response to a second pressure,
    wherein said first pressure is less than said second pressure and the second pressure is less than a normal operating pressure range for the transmission, and
    wherein said first pressure is about 2 to about 10 psi, said second pressure is about 65 to about 100 psi, and said normal operating pressure range is about 125 psi.

2. The transmission of claim 1, wherein said check valve comprises:
    a tubular housing;
    said second valve means is an outer poppet biased in a closed position by a second spring, said second poppet and second spring housed in said tubular housing; and
    said first valve means is a ball biased in a closed position by a first spring and said ball and first spring housed in said outer poppet.

3. The transmission of claim 1, wherein said check valve comprises:
    a tubular housing;
    the second valve means is an outer poppet biased in a closed position by a second spring, said outer poppet and said second spring housed in said tubular housing; and
    said first valve means is an inner poppet biased in a closed position by a first spring and said inner poppet and first spring housed in said outer poppet.

4. The transmission of claim 1, wherein said check valve comprises:
a tubular housing;
said second valve means is an outer fluted poppet biased in a closed position by a second spring and said outer fluted poppet and said second spring housed in said tubular housing; and
said first valve means is a ball biased in a closed position by a first spring, said ball and said first spring housed in said outer fluted poppet.

5. The transmission of claim 1 wherein said check valve comprises:
a tubular housing;
said second valve means is an outer fluted poppet biased in a closed position by a second spring, said outer fluted poppet and said second spring housed in said tubular housing; and
said first valve means is an inner poppet biased in a closed position by a first spring, said inner poppet and said first spring housed in said outer fluted poppet.

6. The transmission of claim 1, wherein said check valve prevents drainage of automatic transmission fluid from the torque converter, when the pump is not operating.

7. A two stage check valve for use in a bore of an input shaft of an automatic transmission, where said transmission has a hydraulic pump, a torque converter in fluid communication with clutch packs through said bore, the two stage check valve comprising:
a tubular housing with an inlet and an outlet both in fluid communication with the torque converter and the clutch packs;
a first valve means for opening in response to a first pressure, said first valve means positioned axially in said tubular housing;
a second valve means for opening in response to a second pressure, said second valve means housing said first valve means and said second valve means housed within said tubular housing in an axial manner;
wherein said first pressure is less than said second pressure and the first pressure is about 2 to about 10 psi, the second pressure is about 65 to about 100 psi.

8. The two stage check valve of claim 7, wherein said first valve means is a ball biased in a closed position by a first spring; and
said second valve means is an outer poppet biased in a closed position by a second spring.

9. The two stage check valve of claim 7, wherein the first valve means is an inner poppet biased in a closed position by a first spring; and
said second valve means is an outer poppet biased in a closed position by a second spring.

10. The two stage check valve of claim 7, wherein the first valve means is a ball biased in a closed position by a first spring; and
a second valve means is an outer fluted poppet biased in a closed position by a second spring.

11. The two stage check valve of claim 7, wherein the first valve means is an inner poppet biased in a closed position by a first spring; and
the second valve means is an outer fluted poppet biased in a closed position by a second spring.

12. A method for regulating flow of automatic transmission fluid from a torque converter to clutch packs which are in fluid communication with said torque converter through a bore in an input shaft, said method comprising:
a first opening of a first check valve means in response to a first pressure; and
a second opening of a second check valve means in response to a second pressure;
wherein said first pressure is less than said second pressure and the first pressure is about 2 to about 10 psi, the second pressure is about 65 to about 100 psi.

13. An automatic transmission system for vehicles, comprising:
a hydraulic pump;
a torque converter which is in fluid communication with clutch packs through a bore in a transmission input shaft; and
a two stage check valve having a tubular housing housed in said bore of said shaft, said check valve in fluid communication with said clutch packs and said torque converter, said check valve having a first valve means for opening in response to a first pressure and a second valve means for opening in response to a second pressure,
wherein said first pressure is less than said second pressure and the second pressure is less than a normal operating pressure range for the transmission, and
wherein the second valve means is an outer poppet biased in a closed position by a second spring, said outer poppet and said second spring housed in said tubular housing and said first valve means is an inner poppet biased in a closed position by a first spring and said inner poppet and first spring housed in said outer poppet.

14. The transmission of claim 13, wherein said first pressure is about 2 to about 10 psi, said second pressure is about 65 to about 100 psi, and said normal operating pressure range is about 125 psi.

15. The transmission of claim 13, wherein said check valve prevents drainage of automatic transmission fluid from the torque converter, when the pump is not operating.

16. A two stage check valve for use in a bore of an input shaft of an automatic transmission, where said transmission has a hydraulic pump, a torque converter in fluid communication with clutch packs through said bore, the two stage check valve comprising:
a tubular housing with an inlet and an outlet both in fluid communication with the torque converter and the clutch packs;
a first valve means for opening in response to a first pressure, said first valve means positioned axially in said tubular housing;
a second valve means for opening in response to a second pressure, said second valve means housing said first valve means and said second valve means housed within said tubular housing in an axial manner,
wherein said first pressure is less than said second pressure, and
wherein the first valve means is an inner poppet biased in a closed position by a first spring and said second valve means is an outer poppet biased in a closed position by a second spring.

17. The two stage check valve of claim 16, wherein the first pressure is about 2 to about 10 psi, the second pressure is about 65 to about 100 psi.

* * * * *